(12) United States Patent
Gutierrez et al.

(10) Patent No.: US 7,640,803 B1
(45) Date of Patent: Jan. 5, 2010

(54) MICRO-ELECTROMECHANICAL SYSTEM INERTIAL SENSOR

(75) Inventors: Roman C. Gutierrez, La Crescenta, CA (US); Tony K. Tang, Glendale, CA (US)

(73) Assignee: Siimpel Corporation, Arcadia, CA (US)

( * ) Notice: Subject to any disclaimer, the term of this patent is extended or adjusted under 35 U.S.C. 154(b) by 86 days.

(21) Appl. No.: 10/982,044

(22) Filed: Nov. 5, 2004

Related U.S. Application Data

(60) Provisional application No. 60/574,677, filed on May 26, 2004.

(51) Int. Cl.
*G01P 9/04* (2006.01)
(52) U.S. Cl. .................. 73/504.04; 73/504.14
(58) Field of Classification Search .............. 73/504.04, 73/504.12, 504.14
See application file for complete search history.

(56) References Cited

U.S. PATENT DOCUMENTS

| | | | | |
|---|---|---|---|---|
| 5,359,893 | A | * | 11/1994 | Dunn ...................... 73/504.12 |
| 5,894,090 | A | | 4/1999 | Tang et al. |
| 6,062,082 | A | * | 5/2000 | Guenther et al. ......... 73/504.12 |
| 6,105,427 | A | | 8/2000 | Stewart et al. |
| 6,308,569 | B1 | | 10/2001 | Stewart |
| 6,360,601 | B1 | | 3/2002 | Challoner et al. |
| 6,367,786 | B1 | | 4/2002 | Gutierrez et al. |
| 6,467,349 | B1 | * | 10/2002 | Andersson et al. ....... 73/504.14 |
| 6,487,907 | B1 | | 12/2002 | Tang et al. |
| 6,539,801 | B1 | | 4/2003 | Gutierrez et al. |
| 6,595,056 | B2 | | 7/2003 | Stewart |
| 6,651,500 | B2 | | 11/2003 | Stewart et al. |
| 6,675,630 | B2 | | 1/2004 | Challoner et al. |
| 6,758,093 | B2 | | 7/2004 | Tang et al. |
| 6,761,068 | B1 | * | 7/2004 | Schmid ................... 73/504.14 |
| 6,914,635 | B2 | | 7/2005 | Ostergard |

FOREIGN PATENT DOCUMENTS

| | | | |
|---|---|---|---|
| GB | 2198231 A | * | 6/1988 |
| WO | WO 00/19169 | * | 4/2000 |

OTHER PUBLICATIONS

Akihiro Koga et al.; "Electrostatic Linear Microactuator Mechanism for Focusing a CCD Camera": Journal of Lightwave Technology, vol. 17, No. 1; p. 43-47; Jan. 1999.

* cited by examiner

*Primary Examiner*—John E Chapman
(74) *Attorney, Agent, or Firm*—Haynes and Boone, LLP

(57) ABSTRACT

A micro-machined MEMS resonator gyroscope and accelerometer is fabricated from an epilayer semiconductor wafer to incorporate a substantially planar, H-shaped resonator mass suspended from a support plate by two opposed elongated springs that couple to the relatively short crossbar member of the H. The masses are harmonically oscillated relative to the support plate and a baseplate portion, and two orthogonal modes of the structure corresponding to the two nearly degenerate fundamental torsional modes thereof are used for sensing angular rate about one axis, and linear acceleration along two axes, of the sensor. The H-shaped mass advantageously incorporates a relatively high length-to-width aspect ratio, and in one embodiment, the springs may advantageously incorporate either a square cross-section, such that the structure can be tuned to substantially match the fundamental frequencies of the two resonance modes of the structure by removing, e.g., by an etching process, a small amount of material from the upper surfaces of the springs.

28 Claims, 5 Drawing Sheets

MICRO-ELECTROMECHANICAL SYSTEM INERTIAL SENSOR

CROSS-REFERENCE TO RELATED APPLICATIONS

This application claims benefit of U.S. Provisional Application No. 60/574,677, filed May 26, 2004.

BACKGROUND OF THE INVENTION

1. Field of the Invention

This invention relates to micro-electromechanical system ("MEMS") devices that sense inertial rotation and acceleration, commonly referred to as gyroscopes and accelerometers. More specifically, the invention relates to MEMS resonant gyroscopes and accelerometers.

2. Related Art

Precision micro-electromechanical accelerometers and gyroscopes have wide application in the field of inertial navigation and guidance. Such sensors are manufactured using sophisticated semiconductor manufacturing, or "micromachining," techniques, and typically incorporate at least one planar mass, typically of silicon, pendulously mounted adjacent to at least one planar structure, also typically of silicon, so as to define an electrical capacitance between the mass and structure. Movement of the mass relative to the structure in response to inertial forces imposed on the sensor, e.g., in response to an acceleration of the sensor along an "axis of sensitivity" thereof, results in a change in the capacitance that is a direct measure of the sensor's acceleration.

In addition to such "direct" measurements of linear accelerations, such sensors can also be used advantageously within an inertial system to "indirectly" measure rotational velocity, or angular rates, about an axis of sensitivity of the sensor, through use of the well known Coriolis principle. Thus, a body moving with a given velocity v relative to a coordinate system that is rotating with an angular velocity $\dot{\theta}$ will experience a Coriolis acceleration $\alpha$ that is equal to the vector cross-product $2\dot{\theta} \times v$, which is directed normal to the path of rotation of the body, and which acts to deflect the relative velocity v of the body in the direction of the angular velocity $\dot{\theta}$ of the system. Hence, if a rotational relative velocity, or more practically for the planar types of structures found in MEMS gyroscopes, a vibratory, sinusoidally varying relative velocity v=V sin ωt, i.e., "dither", is imparted to the mass of the sensor, then the capacitance between the mass and the adjacent structure will likewise vary sinusoidally in response thereto. If an angular velocity $\dot{\theta}$ is then imparted to the sensor, it will experience a Coriolis acceleration given by the relationship $\alpha = 2\dot{\theta} \times V \sin \omega t$, in which the Coriolis acceleration $\alpha$ may be seen as the modulation of the sinusoidally varying capacitance signal of the sensor with a signal that is a function of the angular rotation $\dot{\theta}$ of the sensor, and from which the desired angular rate $\dot{\theta}$ of the sensor may therefore be extracted using well known demodulation techniques.

Examples of such prior art MEMS inertial sensors and "microgyroscopes" may be found in the patent literature, e.g., in U.S. Pat. Nos. 6,758,093 to T. K. Tang et al.; 6,675,630 to A. D. Challoner et al.; 6,651,500 to R. E. Stewart et al.; 6,595,056 to R. E. Stewart; 6,539,801 to R. C. Gutierrez et al.; 6,487,907 to T. K. Tang et al.; 6,367,786 to R. C. Gutierrez et al.; 6,360,601 to A. D. Challoner et al.; and, 5,894,090 to T. K. Tang et al.

One measure of the accuracy of a MEMS inertial sensor is the stability over time of the capacitance between the moving masses and fixed structures, i.e., its "bias stability." Prior art MEMS resonant gyroscopes designed to achieve a bias stability of at least 10 degrees per hour typically use symmetrical resonating structures, such as rings. In a symmetrical resonating structure, there are two "nearly degenerate" modes that couple very efficiently in response to inertial rotation. However, due to the small sensing area available for capacitive sensing, MEMS gyroscopes that use ring structures typically exhibit high angle random walk, or rotation-rate white noise. In addition, due to the crystalline structure of silicon, there is a dependence of spring constant with orientation. This breaks the symmetry of the structure and adversely affects the drift performance of MEMS gyroscopes that use ring structures. Some of the limitations of ring structures have been overcome by using other structural shapes, such as a "cloverleaf" gyroscope with an underlying post. However, these devices are not substantially planar in configuration, and consequently, are more difficult to manufacture and package.

Additionally, for any symmetrical structure, the resonant motion of the structure about its axis of symmetry can be described as a linear combination of two orthogonal modes of rotation or oscillation. The resonant motions involve resilient flexing by different portions of the structure. As a practical matter, the symmetry of a symmetrical structure can never be really perfect, and accordingly, to achieve an accurate sensor, expensive, high-precision machining of the structure is required to approach true symmetry as closely as possible.

Accordingly, there is a long-felt but as yet unsatisfied need in the industry for a highly accurate, substantially planar MEMS resonant gyroscope that is simple in construction, avoids expensive, high-precision machining, and is therefore easy and inexpensive to manufacture and assemble.

BRIEF SUMMARY OF THE INVENTION

In accordance with the present invention, a MEMS gyroscope is provided in which the same spring is commonly shared by both resonant motions of the resonator, but in which the spring extends in opposite directions. This arrangement results in the mechanical factors that affect the spring constant being made common to both resonant motions of the resonator, thereby resulting in a high-precision degenerate resonator structure that is substantially easier to manufacture than prior art resonator structures.

In one advantageous embodiment, the resonator gyroscope and accelerometer of the present invention comprises a substantially planar, H-shaped resonator mass that is suspended for relative movement from a support plate by two opposed springs, or "flexures" that couple to opposite sides of the relatively short crossbar member of the H. The two orthogonal modes of the structure that are used for sensing rotation correspond to the nearly degenerate fundamental torsional modes. The H-shaped mass is made to incorporate a relatively high length-to-width aspect ratio, i.e., one resembling an elongated planar prism, to thereby improve the Coriolis force coupling between the two torsional modes thereof.

The "frequency split," i.e., the frequency mismatch of the two fundamental modes, of this embodiment is given by the difference between the inertia I and the spring constant k of the two modes:

$$\frac{\Delta f}{f} = \frac{1}{2}\left(\frac{\Delta k}{k} - \frac{\Delta I}{I}\right).$$

Since the H-shaped mass closely resembles a rectangular prism, the mismatch in frequency due to inertia mismatch may be approximated by:

$$\frac{\Delta f}{f} \approx \frac{h^2 - w^2}{2L^2},$$

where h is the height, w is the width, and L is the length of the mass, and f is the resonant frequency for the torsional mode. Using, for example, h=20 microns, w=110 microns, L=5 mm, and f=9 kHz, the frequency split can be calculated to be only about 2.1 Hz. This means that, although the mass is not perfectly symmetrical, the frequency split resulting from the asymmetry of the mass is nevertheless very small, thus illustrating an important feature of the invention, viz., the provision of a gyroscope with a resonating mass that is not perfectly symmetrical, but one that has a very small inertial asymmetry.

If the springs supporting the mass are made to incorporate a square cross-section with dimension a, the frequency split due to asymmetry in the spring cross-section of $\Delta a$ can be approximated by:

$$\frac{\Delta f}{f} \approx \frac{\Delta a}{a}.$$

In one advantageous embodiment of the present invention, the frequency mismatch is reduced or virtually eliminated by simply etching the upper surface of the springs in the vertical direction, using an anisotropic process such as reactive ion etching, to reduce their vertical thickness, or height. This process enables a close matching of the two resonance modes of the structure to be achieved by etching only a few hundred nanometers from the upper surface of the springs. In one possible embodiment of a device "tuning" method, the resonance frequencies are measured first, and the amount of etching required is then determined, based on the measured frequency split. In a variation of this embodiment, the springs are purposefully fabricated a few hundred nanometers too thick, or tall, so that they will always require some trimming, assuming "worst case" etch and epilayer thickness errors.

As a result of the foregoing procedure, the present invention provides a MEMS resonator gyroscope that is "close-to-degenerate," and that can be made "nearly degenerate" with a simple, inexpensive, controlled unidirectional etch of the upper surface of the springs. If the springs supporting the mass are made to incorporate a rectangular cross-section with dimensions a, b, and the resonance modes use bending and torsion of said springs, the frequency split due to asymmetry in the spring cross-section of $\Delta a$, $\Delta b$ can be ignored, given that a>b. In this case, the frequency mismatch is determined by the errors in the length of the spring and can be approximated by:

$$\frac{\Delta f}{f} \approx \frac{\Delta L}{L}.$$

As a result of the foregoing design, the present invention provides a MEMS resonator gyroscope that is "nearly degenerate," even in the presence of errors in the cross-section of the springs.

A better understanding of the above and many other features and advantages of the invention will become readily apparent from a consideration of its detailed description below, particularly if such consideration is made in conjunction with the several views of the appended drawings.

DETAILED DESCRIPTION OF THE INVENTION

Figure 3:
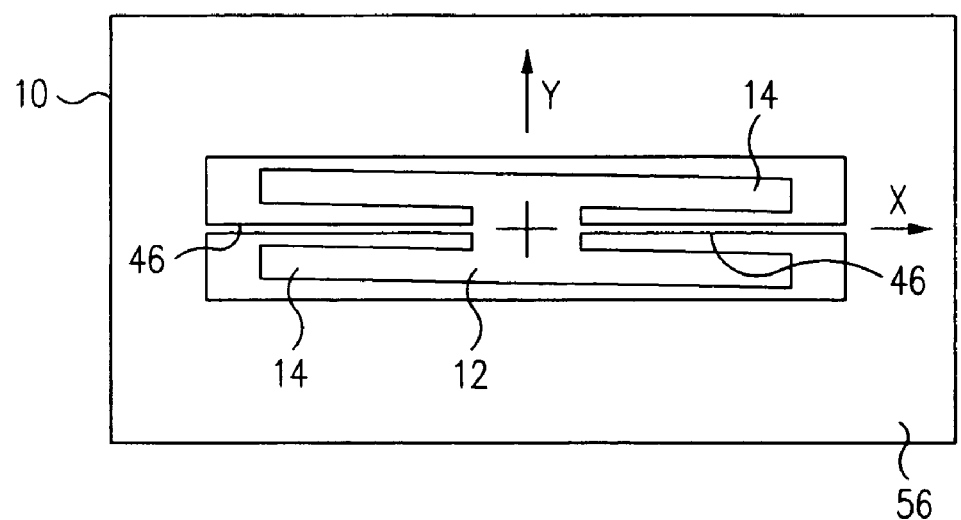
FIG. 3 is a top plan view of the resonator portion of the exemplary sensor, showing the angular displacement of the resonator about a Z axis passing through the centroid of the resonator and perpendicular to X-Y plane thereof during one mode of oscillatory motion thereof.

An exemplary embodiment of a MEMS inertial sensor 9 in accordance with the present invention includes two major portions: A resonator portion 10, comprising a movable, symmetrical planar mass 12, and a fixed baseplate portion 11. As illustrated in FIG. 3, the movable mass 12, sometimes referred to as a "proof mass," is flexibly suspended from a planar support frame 56 by one or more opposed "flexures," or springs 46, and the resonator and support frame, in turn, are sandwiched between generally planar lower and upper cover portions 58 and 68, respectively, of the baseplate portion 11 by a pair of spacer rings or frames 57 and 67, respectively, as illustrated in the cross-sectional elevation view of the sensor of FIG. 4.

Figure 1:
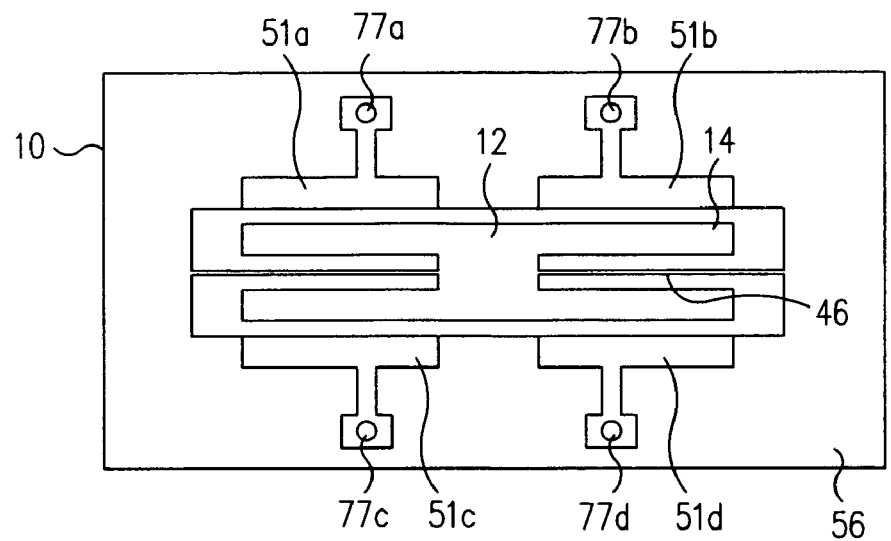
FIG. 1 is a top plan view of an inertial sensor in accordance with an exemplary embodiment of the present invention, with an upper baseplate, or cover portion thereof removed to reveal an underlying resonator portion thereof.

FIGS. 1 and 3 are top plan views of the resonator portion 10 of an inertial sensor 9 according to a first exemplary embodiment of the present invention. In this particular embodiment, a substantially planar, H-shaped mass 12 is flexibly coupled to the support frame 56 by two opposed, resilient, linear springs 46, which couple to the cross-bar of the H on opposite sides thereof, as illustrated in the figures. The mass has arm portions 14 that respectively extend laterally well beyond the locations at which the springs 46 couple to the mass 12. The resonator portion 10, including the mass, the support frame and the springs, is advantageously fabricated as a single integral piece from an epilayer semiconductor wafer, such a Silicon-on-Insulator ("SOI") wafer. Such a wafer is composed of a silicon epilayer that is, for example, 20 microns thick, disposed on a silicon dioxide epilayer that is, for example, 2 microns thick, which in turn, is disposed on a silicon "handle" layer, or substrate, that is, for example, 400 microns thick.

The mass 12 and springs 46 of the resonator 10 are preferably integrally etched from the epilayer so that they are, for example, 20 microns thick, and are then separated from the wafer. Four excitation/sensor electrodes 51*a*-*d* (see FIG. 1) are also etched from the epilayer, and are electrically insulated from the support frame 56 by the dielectric silicon dioxide epilayer underlying them. By electrically coupling the support frame 56 to ground, the mass 12 and springs 46, which are electrically coupled to the frame 56, are thereby also grounded. Thus, when a voltage is applied to an "excitation" electrode of the resonator, e.g., electrode 51*a*, an electrostatic attractive force is generated between the electrode 51*a* and the mass 12, and therefore results in an angular displacement of the mass 12 relative to the frame 56, as illustrated in the plan view of the resonator of FIG. 3, i.e., the mass will rotate clockwise or anticlockwise about a Z axis (see FIG. 4) passing through its centroid and perpendicular to the plane of the mass containing a pair of mutually orthogonal axes, X and Y, as illustrated in the figures.

As will also be apparent, if a voltage is applied to a second excitation electrode on an opposite side or end of the mass 12, e.g., electrode 51*b* or 51*c*, the electrostatic torque acting on the mass 12 will be doubled, resulting in an even greater angular displacement of the mass. Further, it may be noted that if appropriately phased voltages that vary harmonically, e.g., sinusoidally, are applied to the driving electrodes, the mass 12 will oscillate, or "dither," in the X-Y plane and about the Z axis between two opposite angular positions of maximum amplitude, as described in more detail below.

The movement of the mass 12 causes the electrical capacitance between the mass and the support frame 56 adjacent to a pair of "sensor" electrodes, e.g., 51*b* and 51*d* located on opposite sides or ends of the mass to vary responsively. If a fixed voltage is coupled to one or both of these electrodes, electrical charge wilt then flow into or out of the electrode(s) to maintain a constant relative voltage on the respective capacitor(s) defined therebetween. This current can be measured using a charge or transimpedance amplifier to determine the motion of the mass 12 relative to the support frame 56, and hence, relative to the baseplate portion 11 of the sensor 9. Additionally, the respective outputs of a pair of opposite sensor electrodes, e.g., 51*c* and 51*d*, or 51*b* and 51*d*, may be electrically subtracted from each other, or "differenced," resulting in a so-called "differential-capacitor" type of sensor in which small, transient or common mode errors in the sensor electrode outputs serve to cancel each other out, thereby resulting in more accurate inertial system measurements.

Figure 2:
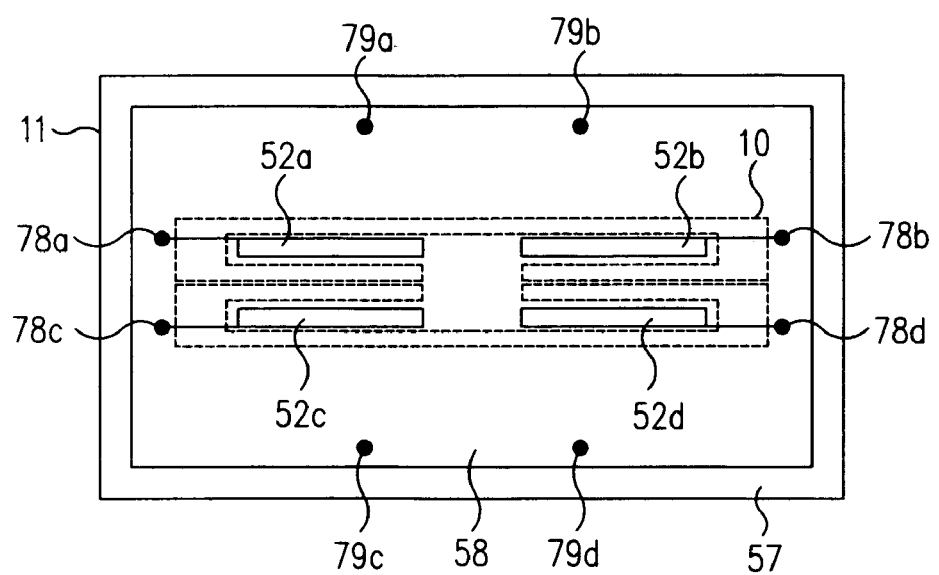
FIG. 2 is a top plan view of the exemplary inertial sensor, with the upper baseplate and resonator portion removed to reveal a lower cover of the baseplate portion thereof.

As above, additional electronics can be used to excite the mass 12 into a resonance mode by the application of appropriately phased alternating voltages to the excitation electrodes, e.g., electrodes 51*a* and 51*b*. Electrical contacts, e.g., solder bumps 77*a*-*d* (see FIG. 1), may be disposed on the electrodes 51*a*-*d* to form the basis for an electrical interconnection of the resonator 10 with the baseplate portion 11. As illustrated in FIG. 2, the lower cover 58 of the baseplate portion of the sensor 9 incorporates four electrodes 52*a*-*d*, which are electrically insulated from the underlying baseplate cover 58 by the thin, silicon dioxide epilayer described above. A lower ring frame, or spacer 57 is built onto the upper surface of the lower cover of the baseplate portion 11 to provide a space between the resonator 10 and the baseplate electrodes 52*a*-*d*. As illustrated in the cross-sectional elevation view of FIG. 4, an upper spacer or ring frame 67 is also provided on the lower surface of the upper cover 68 of the baseplate portion to provide a space above the resonator.

The baseplate electrodes 52*a*-*d* function in a manner similar to those of the resonator excitation/sensor electrodes 51*a*-*d* to excite and/or sense the motion of the resonator mass 12. The baseplate electrodes 52*a*-*d* are coupled to filled, electrical "vias" 78*a*-*d* that pass through but are electrically insulated from the baseplate lower cover 58 to its lower surface. These vias are filled with, e.g., a metal, to enable a hermetic seal of the resonator within a low-pressure environment to be achieved that effects ensures a minimal damping on the motion of the resonator mass 12. Additional vias 79*a*-79*d* are provided to electrically couple to the resonator electrodes 51*a*-51*d*. In one possible embodiment, the upper and lower covers 58 and 68 of the baseplate portion 11 are both manufactured using silicon micromachining by etching the vias 78*a*-78*d* and 79*a*-79*d*, etching the spacers 57 and 59, oxidizing the silicon, depositing metal, filling in the vias by electroplating, and patterning the metal to form the electrodes 52*a*-*d*. The lower and upper spacers 57 and 58 may be, for example, 1 micron high each, and may be made by oxidizing the wafer, patterning the spacer using photoresist, and selectively etching the oxide. In one advantageous embodiment, the respective upper and lower surfaces of the two spacers may be covered with metal and solder to enable a metal-to-metal seal to be formed with the resonator support frame 56 and thereby form a hermetically sealed enclosure about the resonator. In one possible embodiment, a "getter" of a known type may be placed inside the hermetic enclosure to ensure that a low pressure or vacuum environment is maintained within the enclosed space for the life of the sensor 9.

In the plan view of FIG. 3, the pendulous mass 12 of the resonator portion 11 is shown at one point in its resonant motion, illustrating the torsional mode that is excited using one or more of the excitation electrodes 51*a*-*d*. As described above, in this mode of excitation, the mass 12 oscillates in the X-Y plane and about the Z axis (see FIG. 4) extending through its centroid. An exemplary amplitude of motion of the mass is between about 1 and 20 microns, and is limited by the gap between the mass 12 and the support frame 56 below the electrodes 51*a*-*d*. In general, it is desirable to have a relatively large amplitude of motion of the mass to increase the sensitivity of the inertial sensor to rotation, or angular rate, in response to the Coriolis force acting thereon, in the following manner.

Figure 4:
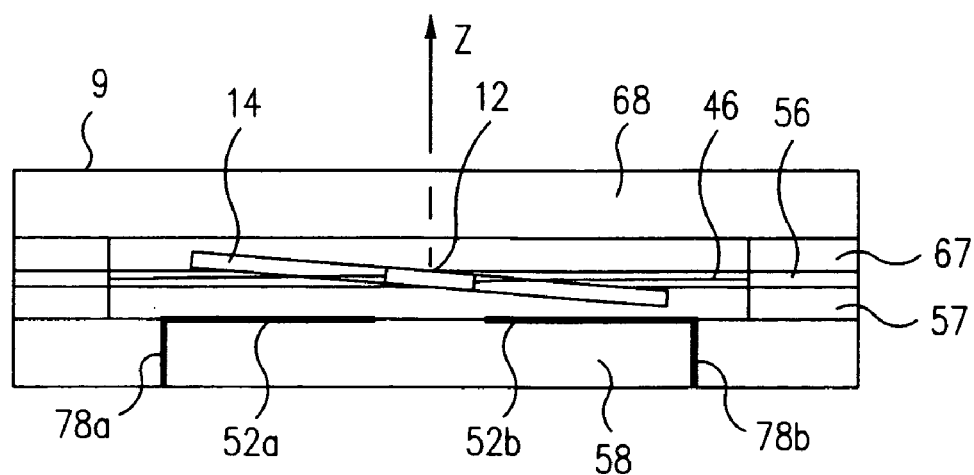
FIG. 4 is a cross-sectional elevation view of the sensor, showing the angular displacement of the resonator about the Y axis thereof as a result of a Coriolis acceleration acting thereon during an angular rotation of the sensor about the X axis thereof.

During a rotational motion of the sensor about an axis parallel to the long axis of the mass 12, i.e., about the X-axis of FIG. 3, the oscillatory motion of the mass 12 couples into the oscillatory motion of the mass shown in the cross-sectional elevation view of FIG. 4, i.e., the mass 12 continues to oscillate, or dither, about the Z-axis through its centroid, but the X-Y plane of the mass, and hence, the Z-axis, are rotated through an angular displacement relative to the horizontal, as illustrated in FIG. 4. This coupling is the result of the Coriolis force described above, which acts on the oscillating mass 12 during a rotational movement of the sensor about the X-axis to deflect the relative velocity of the mass in the direction of the angular motion of the sensor about the X-axis.

Since the oscillatory motion of the mass is such that there are minimal forces impressed on the resonator, the oscillatory motion shown in FIG. 3 couples into the oscillatory motion shown in FIG. 4 to maintain a constant motion in inertial coordinates. The angular rate of the sensor 9 about the X-axis is then measured by determining the amplitude of the displacement of the oscillating mass 12 shown in FIG. 4. As discussed above, the resonator portion 10 is typically electrically grounded. If a voltage is applied to one or more of the sense electrodes 52a-d of the lower cover (FIG. 2), as the resonator mass 12 oscillates, current flows into and out of the capacitor formed by the electrode 52a and the resonator 12. This current can then be sensed using an amplifier to determine the amplitude of the motion.

The description of the inertial sensor 9 above contemplates a so-called "open loop" sensor operation, i.e., one in which the demodulated output of the sensor is immediately taken as the measure of the inertial forces acting on the resonator, without regard to the changes in the sensitivity of the sensor that may be caused by the operation of such inertial forces. However, it is possible, and in some cases more desirable from the standpoint of accuracy, to confect a "closed loop" inertial system, in which the differential changes in the capacitance are fed back to the sensor in the form of electrostatic field forces that drive the resonator mass of the sensor in such a way as to restore and maintain the mass in its original un-reacted state, and in which the measure of the forces necessary to restore the central plate to such condition and to maintain it there is then taken as the measure of the inertial forces acting on the sensor.

Figure 5:
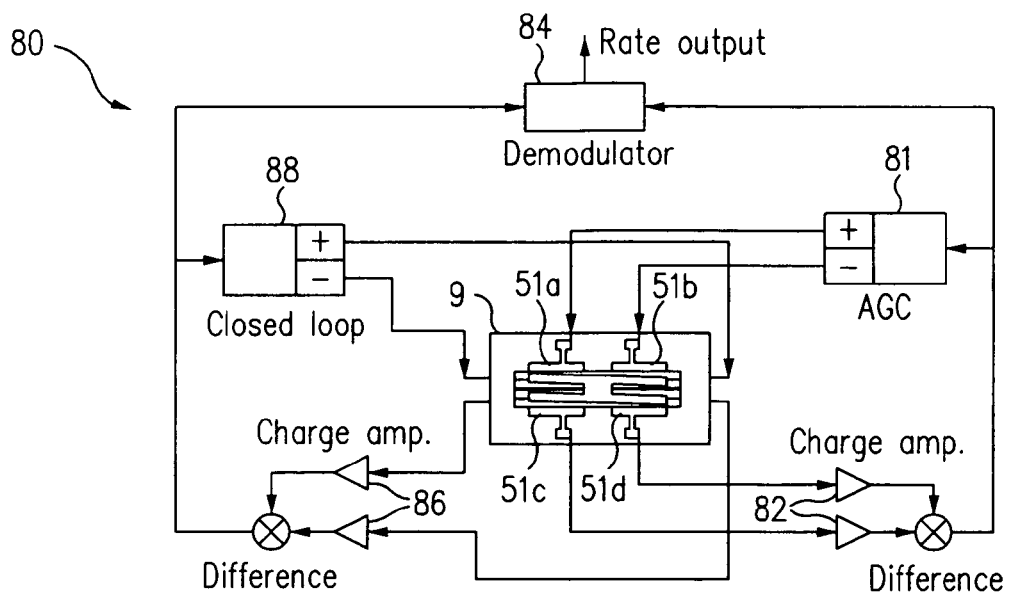
FIG. 5 is a schematic and functional block diagram of an inertial sensor system in accordance with an exemplary embodiment of the present invention.

Such a "closed loop" inertial sensor system 80 incorporating an inertial sensor 9 of the type described above is illustrated in the schematic and functional block diagram of FIG. 5. The circuit of the closed loop system includes an automatic gain control ("AGC") driver circuit 81 that connects to two resonator excitation electrodes disposed at opposite sides or ends of the resonant mass 12, e.g., electrodes 51a and 51b of FIG. 1. The AGC circuit functions to maintain a constant direction and amplitude of motion of the resonator mass 12, regardless of the inertial forces acting thereon. To achieve this end, two sensor electrodes disposed at opposite sides or ends of the mass, e.g., electrodes 51c and 51d, are connected to charge amplifiers 82 that detect the sinusoidal signal generated by the oscillatory motion of the resonator mass in the X-Y plane, as above. The difference between these two signals is taken, as above, to eliminate any common mode signals that may result from electrical coupling into the input of the charge amplifiers, or from unwanted resonator motion. The resulting sinusoidal signal is then fed back into the AGC driver circuit 81, which measures the amplitude of the difference signal. If the amplitude of the signal is lower than the "set point," the AGC circuit increases the amplification of the sinusoidal signal and provides that signal to the electrodes 51a and 51b. If the amplitude of the signal is higher than the set point, the AGC reduces the amplification of the sinusoidal signal and provides the reduced signal to the excitation electrodes 51a and 51b.

As a result of this variable amplification, the AGC circuit 81 functions to maintain the amplitude of the sinusoidal signal substantially equal to the initial set point. Further, the AGC circuit also ensures that the sinusoidal motion of the resonator mass 12 is maintained precisely at its resonance frequency, since the gain of the AGC loop is proportional to the mechanical gain of the resonator, and this is substantially higher at the resonance frequency. The remaining portion of the circuit of the system 80 is dedicated to demodulator circuitry 84, for extracting angular rate information from the output signals, and closed loop, angular rate sense circuitry, as described above.

Regarding the latter circuitry, two sense electrodes 52c and 52d on the lower cover 57 of the base plate portion 11 (see FIG. 2) are coupled to charge amplifiers 86 that detect the sinusoidal signal created by the out-of-plane oscillatory motion of the resonator mass 12 in response to a Coriolis force acting upon it, as described above. The difference between these two signals is also taken to eliminate any common mode signals that may result from electrical coupling into the input of the charge amplifiers or from unwanted resonator motion. This sinusoidal signal is fed back into a closed-loop, high gain amplifier 88 that provides signals to the electrodes 52a and 52b. If the gain of the closed-loop amplifier is sufficiently high, the motion of the resonator out of its initial plane will thereby be made close to zero. The amplitude of the signal fed to the electrodes 52a and 52b then becomes an indication of the force required to keep the resonator mass 12 from moving out-of-plane. For this reason, closed-loop control systems of this type are often referred to as "force-rebalance" systems. As illustrated in the figure, the sense signal is fed into one input of the demodulator 84, and the drive signal is fed into the second input of the demodulator. The demodulator multiplies the two sinusoidal signals, and puts out a voltage that is proportional to the amplitude of the sense signal, since the drive signal is kept constant by the AGC circuitry 80, as above. And, since the Coriolis force is linearly proportional to rotation rate, this output is also linearly proportional to the rate of rotation, or angular rate, of the sensor about the X axis.

Figure 6:
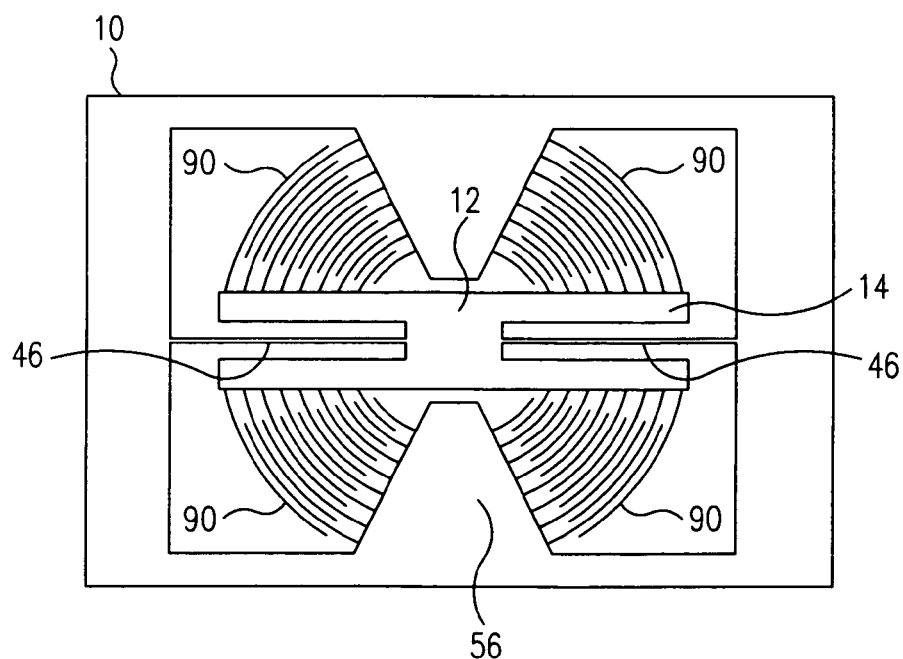
FIG. 6 is a top plan view of the resonator portion of another exemplary embodiment of an inertial sensor in accordance with the present invention.
Figure 7:
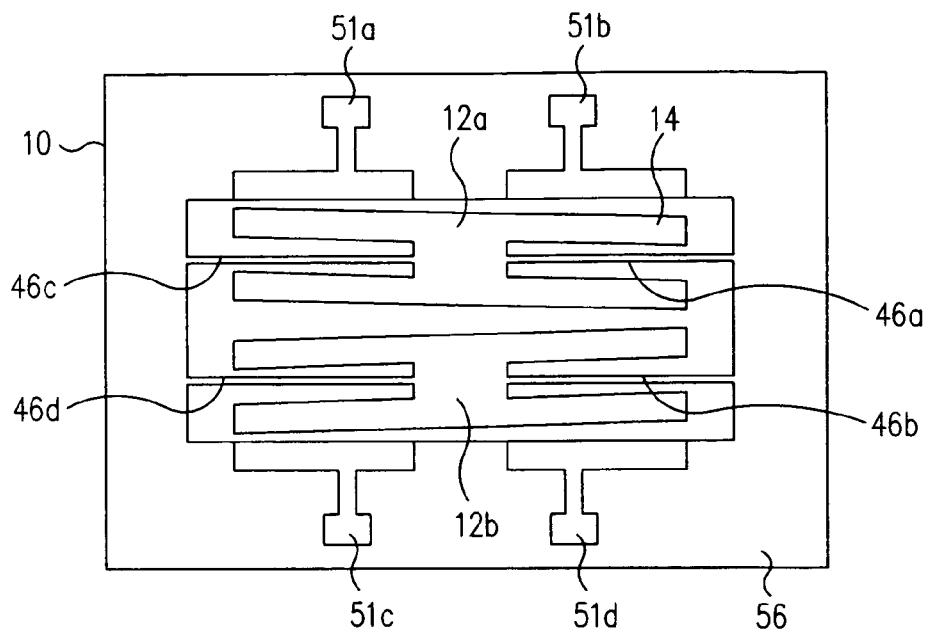
FIG. 7 is a top plan view of the resonator portion of another exemplary embodiment of an inertial sensor in accordance with the present invention.

In the inertial sensor 9 of the present invention, there are many possible alternative embodiments of the resonator 10 that are related to the basic resonator configuration described above. Two such embodiments are shown in FIGS. 6 and 7, respectively. In FIG. 6, upright, interleaved, arcuate "comb drives" 90 are used in place of the planar electrodes 51a-d of the first embodiment illustrated in FIG. 1. One side of each set of the comb drives may be formed integrally with the H-shaped mass 12, and one side may be formed, e.g., by micromachining, integrally with the lower cover portion 57 of the baseplate portion 11, as described above. These comb drives enable a larger amplitude drive signal to be applied to the pendulous mass 12. Although shown greatly exaggerated in size in the figure, these comb drives may nevertheless affect the inertia in the two resonant motion directions (i.e., both in-plane and out-of-plane), and this effect should be taken into account in the design, to ensure the drive and sense resonance frequencies do not differ too greatly.

FIG. 7 illustrates a resonator 10 having a pair of counter-balanced masses 12a and 12b. This configuration can be used to increase the "Q factor" of the resonator, i.e., the sharpness of its response curve, since there is much less interaction of such an arrangement with elements in the surrounding environment. In this embodiment of the resonator, the two masses 12a and 12b are each suspended from the support frame 56 by a respective pair of opposed springs 46a and 46b. Each of the springs in the respective pairs may be joined directly to the support frame 56, or may be coupled to it through more elaborate spring structures. As shown in the figure, during drive resonant motion, the two masses 12a and 12b oscillate 180 degrees out of phase, such that the respective angular momenta of the two masses are exactly counterbalanced. This arrangement reduces the interaction of the masses with elements in their immediate surroundings and thereby decreases the mechanical losses of the system. In the sense direction, the two masses also oscillate out of phase with each other, which also reduces mechanical loss. This increases the mechanical Q factor of the resonator, thereby improving the performance of the gyroscope. In this counterbalanced embodiment, four electrodes 51a-d are used, as above, to excite and sense the in-plane motion of the resonator. The sensor electrodes 52a-d can be arranged as shown in FIG. 2, which effectively doubles the sensing area.

Figure 8:
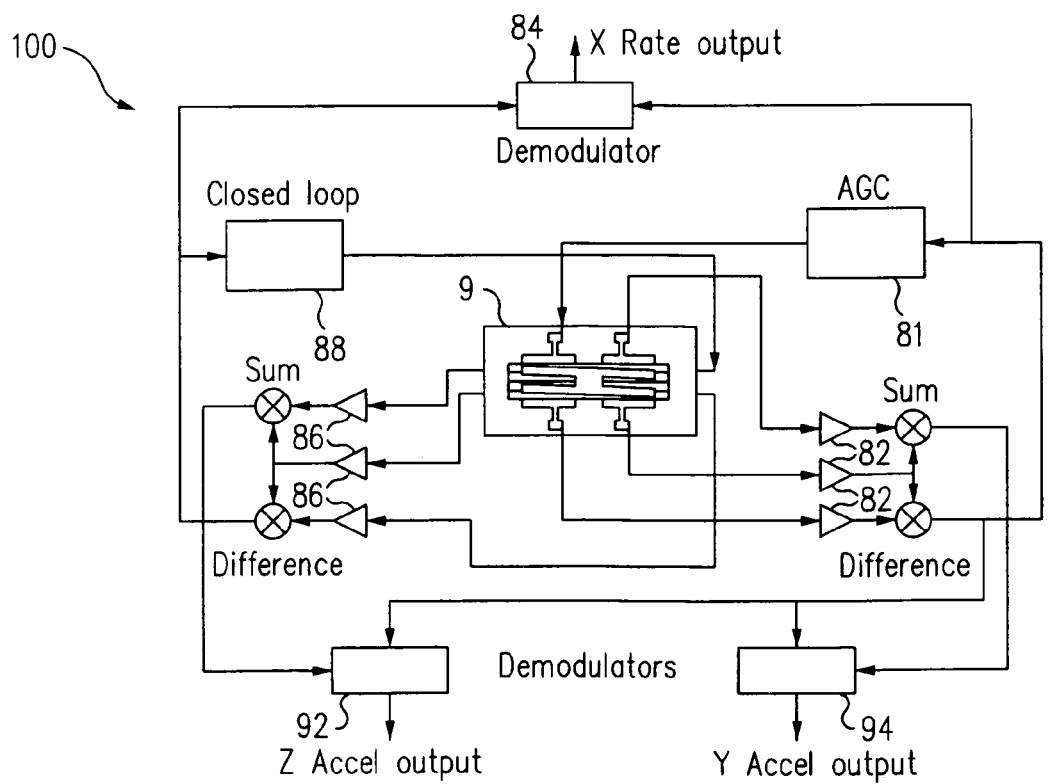
FIG. 8 is a schematic and functional block diagram of an inertial sensor system in accordance with another exemplary embodiment of the present invention.

In addition to indirectly sensing rotation, or angular rate, applied to the sensor 9 through the Coriolis effect, as above, the inertial sensors 9 of this invention may also be used to directly sense linear acceleration applied to the sensor along either one or two sensitive axes thereof. A schematic and functional block diagram of an inertial system 100 incorporating electronics capable of sensing both angular rate and linear acceleration applied to the sensor is shown in FIG. 8, wherein the same or similar features to those of FIG. 5 are numbered similarly.

In addition to the electronics described above in connection with the inertial system 80 of FIG. 5, open-loop demodulators 92 and 94 are also included for outputting signals proportional to the linear accelerations experienced along the Z and Y axes of the sensor, respectively. However, those of skill in the art will readily appreciate that these additional open-loop demodulators may be made closed-loop by providing feedback to the excitation electrodes, as described above in connection with FIG. 5. As illustrated in the figure, additional charge amplifiers are also provided to the electrodes 51b and 52a. To sense the acceleration along the Y axis (in-plane), the output from electrode 51b is summed with the output from opposing electrode 51d. As the mass 12 oscillates along the drive resonance, signals will be measured from these two electrodes. If the mass 12 is centered with respect to these two electrodes, summing their signals will substantially cancel them, since the two signals will be equal and 180 degrees out of phase. However, if the mass is displaced from its centered position by an acceleration along the Y axis, the two signals will no longer be equal and their sum will therefore yield a sinusoidal signal at the drive frequency. This sinusoidal signal is demodulated with the drive signal to yield a voltage proportional to the linear acceleration along the Y axis. To sense acceleration along the Z-axis (i.e., out of plane), the output from electrode 52a is summed with the output from electrode 52c, as illustrated in FIG. 8. The drive motion will create a residual signal in both of these electrodes due to the change in overlap between the mass 12 and the sense electrodes 52a and 52c. As the gap between the mass 12 and the electrodes 52a and 52c is changed by a linear acceleration along the Z axis, the amplitude of this residual signal will also change proportionally.

Figure 9:
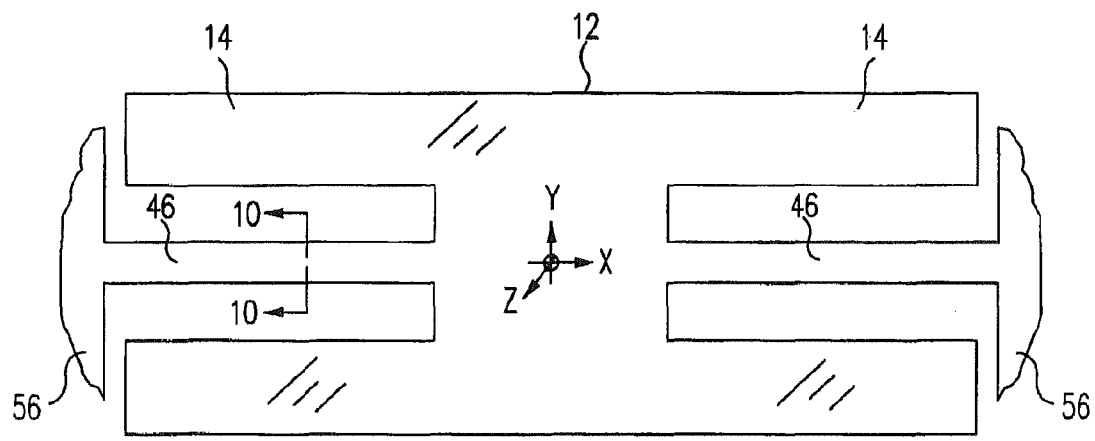
FIG. 9 is a top plan view of the resonator portion of another exemplary embodiment of an inertial sensor in accordance with the present invention.

As illustrated in the enlarged partial plan view of an exemplary pendulous mass 12 of the present invention of FIG. 9, it may be observed that the each of the resonator 10 embodiments described above incorporate one or more planar, substantially H-shaped pendulous masses 12 that are suspended from a support plate 56 by two springs 46 that extend in opposite directions and respectively couple between the relatively short crossbar of the H and the adjacent support plate 56. The two orthogonal modes of the structure that are used for sensing rotation correspond to the "nearly degenerate" fundamental torsional modes of the resonator. The H-shaped masses thus incorporate a relatively high length-to-width aspect ratio, i.e., one resembling an elongated, rectangular planar prism, which configuration serves to increase the Coriolis-force-coupling between the two torsional modes of the resonator.

The "frequency split" $\Delta f/f$ of these resonators 10, i.e., the frequency mismatch between the two fundamental modes of resonances of their masses 12, is given by the difference between the inertia I and the spring constant k of the two resonator modes:

$$\frac{\Delta f}{f} = \frac{1}{2}\left(\frac{\Delta k}{k} - \frac{\Delta I}{I}\right).$$

Further, since the H-shaped masses 12 closely resemble rectangular prisms, the mismatch in frequency due to any inertia mismatch can be approximated by the relation:

$$\frac{\Delta f}{f} \approx \frac{h^2 - w^2}{2L^2},$$

where h is the height, w is the width, and L is the length of the mass, and where f is the resonant frequency of the torsional mode. For example, if h=20 microns, w=110 microns, L 5 mm, and f=9 kHz, the frequency split is only about 2.1 Hz. This means that, although the mass is not perfectly symmetrical, the frequency split resulting from the asymmetry of the mass is nevertheless very small, thus illustrating one important feature of this invention, viz., the provision of a gyroscope with a resonating mass that, while not perfectly symmetrical, has a very small inertial asymmetry.

Figure 10:
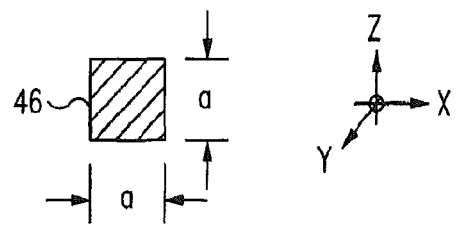
FIG. 10 is a cross-sectional view of a spring of the resonator of FIG. 9, as taken along the section lines 10-10 therein.

Of further importance, if the springs 46 supporting the respective masses 12 are made to incorporate a square cross-section having a common dimension a, i.e., their cross-sectional horizontal thickness, or width, is made substantially the same as their cross-sectional vertical thickness, or height, as illustrated in the cross-sectional detail view of FIG. 10, it will be seen that the frequency split due to any asymmetry in the spring cross-section of $\Delta a$ is given approximately by:

$$\frac{\Delta f}{f} \approx \frac{\Delta a}{a}.$$

As a practical matter, some differences will typically exist between the cross-sectional height and width of the springs due to normal manufacturing tolerances and imperfections, and these dimensional differences in the springs will lead to unwanted frequency mismatches. For example, using a=20 microns, $\Delta a$=0.2 microns, and f=9 kHz, the resulting frequency split will be approximately 90 Hz. Since this frequency split is undesirably large, it is desirable to provide a simple, inexpensive method for "tuning" the springs 46 to reduce the frequency mismatch. The above relationship suggests one such procedure, viz., adding or removing small amounts of material from one more of the four exterior surfaces of the springs to reduce $\Delta a$ to as small a value as possible.

In particular, it has been discovered that the frequency mismatch $\Delta f/f$ can be corrected, i.e., reduced to an acceptable value, easily and inexpensively by the following resonator "tuning" procedure: 1) Measuring the difference between the vertical height and horizontal width of the springs 46 using either metrology or resonance testing; 2) computing the amount of material that needs to be removed from the upper surface of the springs to make the frequencies of the two resonant modes substantially equal; 3) etching that amount of material from the upper surface of the springs (i.e., reducing their vertical thickness, or height); and, 4) if necessary, repeating the preceding steps until the frequency mismatch is reduced to the level desired. In one advantageous embodiment of this method, the etching step is effected by a reactive ion etching of the entire upper surface of the springs. This process is inherently compatible with wafer scale manufacturing techniques, and due to its directionality or "anisotropy," reactive ion etching is capable of precisely reducing the height of the springs by a very small, controlled amount, e.g., by a few hundred angstroms, while leaving their width substantially unchanged. In one advantageous variation of the method, the respective vertical thicknesses of the springs 46 are purposefully fabricated a few hundred nanometers too thick, so that they always require some "trimming," assuming worst case etch and epilayer thickness errors.

As a result of this simple procedure, typical manufacturing errors can be easily corrected as long as the vertical thickness of the springs is slightly larger than their horizontal width. This resonator "tuning" procedure thus provides one of the important advantages of the present invention, namely, a simple, relatively inexpensive process for the manufacture of low-cost, high performance gyroscopes.

Figure 12:
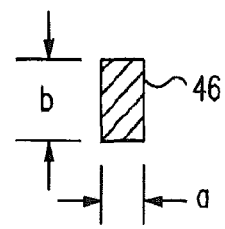
Figure 11:
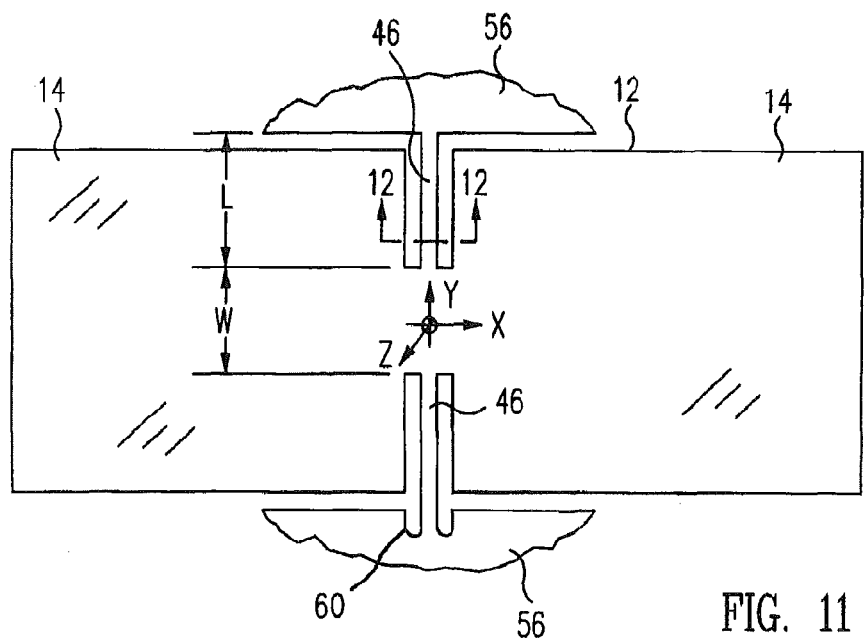
FIG. 11 is a top plan view of the resonator portion of another exemplary embodiment of an inertial sensor in accordance with the present invention; and, FIG. 12 is a cross-sectional view of a spring of the resonator of FIG. 11, as taken along the section lines 12-12 therein.

An exemplary embodiment of a resonator 10 in accordance with another aspect of the present invention is illustrated in the plan view of FIG. 11. In this embodiment, the relatively large length-to-width aspect ratio of the pendulous mass 12 described above is retained, so that the relatively small frequency split $\Delta f/f$ inherent in such a configuration, as discussed above, is also retained. However, unlike the embodiment of FIG. 9, in the embodiment of FIG. 11, the springs 46 do not couple to the mass along its long axis, but instead, along the short axis thereof. In addition, the springs 46 do not have a square cross-section, and in particular, the cross-sectional width of the springs a has been adjusted to be much smaller than the cross-sectional height b, as illustrated in the cross-sectional view of the spring of FIG. 12. In such a configuration, the equations for the spring stiffness $k_i$ then become, for the X, Y and Z coordinate system illustrated in FIGS. 11 and 12:

For rotation about the Z axis:

$$k_Z \propto \frac{a^3 b W^2}{L^3},$$

and for rotation about the Y axis:

$$k_Y \propto \frac{a^3 b}{L},$$

where a is the cross-sectional width of the springs, b is the cross-sectional height of the springs, L is the length of the springs, and W is the width of the crossbar of the mass at the location at which the two springs couple to it, as illustrated in FIGS. 11 and 12.

It may be seen from the above that, since the dependence on a and b are the same for the X and Y stiffnesses of the two springs, any manufacturing errors in these dimensions will not substantially affect the frequency split, and moreover, errors in the length of the springs affect the frequency difference in accordance with the following approximation:

$$\frac{\Delta f}{f} \approx \frac{\Delta L}{L}.$$

Thus, since the length L of the respective springs 46 is much larger than their width a, while the errors in their width are approximately the same as the errors in their length L, this embodiment of the resonator 10 results in a frequency mismatch that is inherently at least an order of magnitude smaller than that of the embodiment illustrated in FIG. 9 above, without need for any "tuning" of the resonator. Additionally, if any reduction in the frequency mismatch should be desired, this can be effected in a tuning procedure similar to that described above in connection with the embodiment of FIG. 9, in which the respective lengths of the two springs, rather than their height, is adjusted by, e.g., using a reactive ion etching process as above, etching a small relief 60 through the support plate 56 on both sides of an outer end of one or both springs to lengthen them slightly, as illustrated in FIG. 11.

As will now be evident to those of skill in this art, many modifications, substitutions and variations can be made in and to the materials, components, configurations and methods of implementation of MEMS inertial sensor 9 of the present invention without departing from its spirit and scope. Accordingly, the scope of the present invention should not be limited to the particular embodiments illustrated and described herein, as they are merely exemplary in nature, but rather, should be fully commensurate with that of the claims appended hereafter and their functional equivalents.

What is claimed is:

1. An inertial sensor, comprising:
   a planar, H-shaped mass suspended by a pair of elongated springs disposed on opposite sides thereof so as to define a spring-mass system;
   means for exciting the sensor in a first torsional resonance mode and at a constant amplitude of motion; and,
   means for monitoring the rotational motion of the inertial sensor in a second torsional mode and for measuring the rate of rotation of the sensor therein, wherein:
   the springs have substantially identical rectangular cross-sections, sides perpendicular to the plane of the mass and upper and lower surfaces parallel to the plane of the mass, the springs being coplanar with the mass and coaxial with a rotation sensing axis of the sensor passing through the center of mass of the mass,
   the spring-mass system has a first torsional resonance about a drive axis of the sensor disposed perpendicular to the plane of the mass and extending through the center of mass thereof that is a function of the cross-sectional width of the springs, and a second torsional resonance about a third axis of the sensor passing through the center of mass of the mass and disposed perpendicular to the rotation sensing and drive axes of the sensor that is a function of the cross-sectional height of the springs,
   the respective frequencies of the first and second torsional resonances are substantially equal to each other,
   the monitoring and measuring means uses the motion of the inertial sensor in the first torsional mode to determine the average position of the mass and thereby measure acceleration of the sensor, and,
   the sensor is operable to measure the rate of rotation of the sensor about the rotation sensing axis and a linear acceleration of the sensor along at least one of the drive and the third axes.

2. The inertial sensor of claim 1, wherein the mass has three unique axes of symmetry.

3. The inertial sensor of claim 1, wherein the springs have a substantially square cross-section.

4. The inertial sensor of claim 1, wherein the height of the cross-section of the springs is greater than the width thereof.

5. The inertial sensor of claim 1, wherein the springs contact the mass along an axis of symmetry of the mass.

6. A method for tuning the inertial sensor of claim 1, comprising adjusting the cross-sectional height of the springs such that the respective frequencies of the two torsional resonances are substantially equal to each other.

7. The method of claim 6, wherein adjusting the cross-sectional height of the springs comprises etching a surface of the springs.

8. The method of claim 7, wherein the etching comprises reactive ion etching.

9. The method of claim 6, wherein adjusting the cross-sectional height of the springs comprises selectively etching only a portion of the springs.

10. A method for tuning the inertial sensor of claim 1, comprising adjusting the length of at least one of the springs such that the respective frequencies of the two torsional resonances are substantially equal to each other.

11. The method of claim 10, wherein the length of the at least one spring is adjusted by an etching process.

12. The inertial sensor of claim 1, wherein the inertial sensor comprises silicon and is at least partially made by a micromachining process.

13. The inertial sensor of claim 12, wherein at least the springs are made using deep reactive ion etching of a silicon epilayer.

14. The inertial sensor of claim 1, wherein the mass is suspended above a base plate for sensing and controlling the motion of the mass.

15. The inertial sensor of claim 1, further comprising electrodes disposed on sides of the mass for sensing and controlling the motion of said mass.

16. The inertial sensor of claim 1, wherein the mass is housed in a hermetically sealed enclosure.

17. The inertial sensor of claim 16, wherein the hermetically sealed enclosure is made at least in part by sealing the mass between a base plate and a substrate that is integral with said mass.

18. The inertial sensor of claim 1, wherein the exciting means comprises an automatic gain control.

19. The inertial sensor of claim 1, further comprising a closed-loop control operable to substantially null the motion of the mass in the second torsional mode.

20. The inertial sensor of claim 1, further comprising a demodulator operable to determine the amplitude of a signal corresponding to the rate of rotational motion of the sensor in the second torsional mode.

21. The inertial sensor of claim 1, wherein the mass is elongated along the rotation sensing axis.

22. An inertial sensor, comprising:
two planar, H-shaped masses, each suspended in a common plane by an associated pair of springs disposed on opposite sides thereof so as to define two adjacent spring-mass systems,
the springs of each pair of springs having substantially identical rectangular cross-sections, sides perpendicular to the plane of the associated mass and upper and lower surfaces parallel to the plane of the associated mass, the springs being respectively coplanar with the associated mass, coaxial with a rotation sensing axis of the sensor passing through the center of mass of the associated mass, and parallel to the axis of the other pair of springs, wherein:
each of the spring-mass systems has a first torsional resonance about a drive axis of the associated mass perpendicular to the plane of the mass and extending through the center of mass thereof that is a function of the width of its associated pair of springs, a second torsional resonance about a third axis of the sensor passing through the center of mass of the mass and disposed perpendicular to the rotation sensing and drive axes thereof that is a function of the height of its associated pair of springs, and first and second torsional momenta respectively associated with the first and second resonances thereof;
the first and second torsional momenta of the two spring-mass systems are respectively substantially equal to each other; and,
the respective frequencies of the first and second resonances of the two spring-mass systems are substantially equal to each other; and,
means for driving each of the two spring mass systems harmonically such that they oscillate about their respective drive axes 180 degrees out of phase with each other.

23. The inertial sensor of claim 22, wherein each of the masses is elongated along its respective rotation sensing axis.

24. An inertial sensor, comprising:
a planar, H-shaped prism-shaped planar mass suspended by a pair of elongated, coplanar, coaxial springs and defining a spring-mass system,
the mass having a length, a width and a thickness as measured in a set of three mutually orthogonal reference axes,
the spring-mass system exhibiting first and second torsional resonances about respective ones of a pair of orthogonal axes disposed perpendicular to a rotation sensing axis of the sensor coaxial with the springs when acted upon by a harmonically varying force,
a first one of the axes comprising a drive axis of the sensor disposed perpendicular to the plane of the mass and extending through the center of mass thereof,
a second one of the axes lying in the plane of the mass and being disposed perpendicular to the axis of the springs, wherein
the length of the mass is at least about 45 times greater than the width thereof, and at least about 250 times greater than the thickness thereof, and
the respective frequencies of the first and second torsional resonances are substantially equal to each other.

25. The inertial sensor of claim 24, wherein the respective frequencies of the first and second torsional resonances differ from each other by less than 10 Hz.

26. The inertial sensor of claim 24, wherein the mass is elongated along the second axis.

27. An inertial sensor, comprising a planar elongated mass suspended by a pair of coplanar springs disposed on opposite sides thereof so as to define a spring-mass system, wherein:
each of the springs has a substantially square cross-section, a length greater than its cross-sectional dimensions and is connected to the mass along the elongated axis thereof;
the spring-mass system has a first torsional resonance used for driving the mass in oscillation about a drive axis perpendicular to the plane of the mass and a second torsional resonance for sensing an oscillation of the mass about an axis perpendicular to the springs; and,
the respective frequencies of the first and second torsional resonances differ from each other by an insubstantial amount that is substantially a function of the respective cross-sectional dimensions of the springs.

28. An inertial sensor, comprising:

a generally planar support frame having a central opening therein; and, an elongated planar mass suspended coplanar with the support frame within the central opening thereof by a pair of elongated coplanar springs, the springs being respectively connected by respective inner ends to opposite sides of the mass and by respective outer ends to adjacent edges of the support frame so as to define a spring-mass system, wherein:

each of the springs has a rectangular cross-section, the height of the cross-section being greater than the width thereof;

each of the springs has a length greater than either of the cross-sectional dimensions of the spring and connects to the mass in a direction perpendicular to the elongated axis of the mass;

the spring-mass system has a first torsional resonance used for driving the mass in oscillation about a drive axis perpendicular to the plane of the mass, and a second torsional resonance for sensing oscillation of the mass about an axis parallel to the springs;

the respective frequencies of the first and second torsional resonances differ from each other by an amount that is a function of the respective lengths of the two springs, and the support frame includes a small relief on both sides of the outer end of at least one of the springs so as to make the respective lengths of the springs substantially equal to each other.

* * * * *

UNITED STATES PATENT AND TRADEMARK OFFICE
CERTIFICATE OF CORRECTION

PATENT NO. : 7,640,803 B1
APPLICATION NO. : 10/982044
DATED : January 5, 2010
INVENTOR(S) : Roman C. Gutierrez et al.

Page 1 of 1

It is certified that error appears in the above-identified patent and that said Letters Patent is hereby corrected as shown below:

In the Specifications

In column 5, line 47:

Change the word "wilt" to --will"--

Signed and Sealed this
Fourteenth Day of May, 2013

Teresa Stanek Rea
*Acting Director of the United States Patent and Trademark Office*